(12) United States Patent
Wernlund et al.

(10) Patent No.: US 10,317,247 B1
(45) Date of Patent: Jun. 11, 2019

(54) FENESTRATION UNIT MONITORING APPARATUS WITH TETHERS AND METHODS

(71) Applicant: ANDERSEN CORPORATION, Bayport, MN (US)

(72) Inventors: Chad Wernlund, Baldwin, WI (US); David Plummer, Hudson, WI (US)

(73) Assignee: ANDERSEN CORPORATION, Bayport, MN (US)

( * ) Notice: Subject to any disclaimer, the term of this patent is extended or adjusted under 35 U.S.C. 154(b) by 659 days.

(21) Appl. No.: 14/983,766

(22) Filed: Dec. 30, 2015

Related U.S. Application Data (60) Provisional application No. 62/099,908, filed on Jan. 5, 2015.

(51) Int. Cl.
| | | |
|---|---|---|
| *B60C 23/00* | (2006.01) | |
| *G01D 5/12* | (2006.01) | |
| *E06B 7/00* | (2006.01) | |
| *H01H 36/00* | (2006.01) | |
| *H01H 11/00* | (2006.01) | |

(52) U.S. Cl.
CPC ............. *G01D 5/12* (2013.01); *E06B 7/00* (2013.01); *H01H 11/005* (2013.01); *H01H 36/0013* (2013.01)

(58) Field of Classification Search
CPC .............. E06B 7/00; G01D 5/12; B60Q 11/00
USPC ....... 340/545.6, 545.7, 545.9, 540, 541, 542; 292/240, 241
See application file for complete search history.

(56) References Cited

U.S. PATENT DOCUMENTS

| | | |
|---|---|---|
| 3,525,830 A | 8/1970 | Hawkins |
| 3,641,540 A | 2/1972 | Cutler et al. |
| 4,196,422 A | 4/1980 | Swigert et al. |
| 4,346,372 A | 8/1982 | Sandberg |
| 4,360,803 A | 11/1982 | Heiland |
| 4,381,504 A | 4/1983 | Bitko |
| 4,465,997 A | 8/1984 | Hines |
| 4,755,799 A | 7/1988 | Romano |
| 4,760,380 A | 7/1988 | Quenneville et al. |
| 4,845,471 A | 7/1989 | Chu |
| 5,006,766 A * | 4/1991 | Yuhas ............ E05F 15/619 318/53 |
| 5,077,547 A | 12/1991 | Burgmann |
| 5,226,256 A * | 7/1993 | Fries ............ E05B 47/0012 49/13 |
| 5,311,168 A | 5/1994 | Pease, Jr. et al. |
| 5,355,059 A | 10/1994 | McMillan |
| 5,373,716 A | 12/1994 | MacNeil et al. |
| 5,449,987 A | 9/1995 | McMillan |

(Continued)

*Primary Examiner* — Tai T Nguyen
(74) *Attorney, Agent, or Firm* — Mueting, Raasch & Gebhardt, P.A.

(57) ABSTRACT

The fenestration unit monitoring apparatus with tethers are configured to retrofit an existing fenestration unit to incorporate components that are capable of monitoring the locked or unlocked status of the existing lock assembly and/or the panel position status of a movable panel of the fenestration unit. The fenestration unit monitoring apparatus include a lock status sensor located on a tether such that the lock status sensor can be positioned within an existing fenestration unit lock assembly when a monitor housing of the fenestration unit monitoring apparatus is located on the fenestration unit adjacent the fenestration unit lock assembly.

27 Claims, 8 Drawing Sheets

(56) References Cited

U.S. PATENT DOCUMENTS

| | | | |
|---|---|---|---|
| 5,479,151 | A | 12/1995 | Lavelle et al. |
| 5,486,812 | A | 1/1996 | Todd |
| 5,499,014 | A | 3/1996 | Greenwaldt |
| 5,595,075 | A | 1/1997 | Chen |
| 5,686,890 | A | 11/1997 | Ko |
| 5,712,621 | A | 1/1998 | Andersen |
| 5,783,995 | A | 7/1998 | Jackson |
| 5,841,361 | A | 11/1998 | Hoffman |
| 5,999,095 | A | 12/1999 | Earl et al. |
| 6,057,769 | A | 5/2000 | Stevenson |
| 6,078,269 | A | 6/2000 | Markwell et al. |
| 6,212,923 | B1 | 4/2001 | Clark |
| 6,420,973 | B2 | 7/2002 | Acevedo |
| 6,441,735 | B1 | 8/2002 | Marko et al. |
| 6,615,629 | B2 | 9/2003 | Bates et al. |
| 6,661,340 | B1 | 12/2003 | Saylor et al. |
| 6,724,316 | B2 | 4/2004 | Addy et al. |
| 6,778,086 | B2 | 8/2004 | Morrone et al. |
| 6,853,145 | B2 | 2/2005 | Kang et al. |
| 6,871,885 | B2 | 3/2005 | Goldenberg et al. |
| 6,888,459 | B2 | 5/2005 | Stilp |
| 6,963,280 | B2 | 11/2005 | Eskildsen |
| 6,968,646 | B2 | 11/2005 | Goldenberg et al. |
| 6,987,450 | B2 | 1/2006 | Marino et al. |
| 7,019,639 | B2 | 3/2006 | Stilp |
| 7,023,341 | B2 | 4/2006 | Stilp |
| 7,042,353 | B2 | 5/2006 | Stilp |
| 7,053,764 | B2 | 5/2006 | Stilp |
| 7,057,512 | B2 | 6/2006 | Stilp |
| 7,068,162 | B2 | 6/2006 | Maple et al. |
| 7,079,020 | B2 | 7/2006 | Stilp |
| 7,079,034 | B2 | 7/2006 | Stilp |
| 7,084,756 | B2 | 8/2006 | Stilp |
| 7,091,827 | B2 | 8/2006 | Stilp |
| 7,119,658 | B2 | 10/2006 | Stilp |
| 7,119,678 | B2 | 10/2006 | Katz |
| 7,120,795 | B2 | 10/2006 | Raphael et al. |
| 7,142,111 | B2 | 11/2006 | Eskildsen et al. |
| D534,146 | S | 12/2006 | Stilp et al. |
| 7,147,255 | B2 * | 12/2006 | Goldenberg ........ E05B 45/083 292/241 |
| D534,519 | S | 1/2007 | Stilp et al. |
| 7,158,029 | B1 | 1/2007 | Martyn |
| 7,202,789 | B1 | 4/2007 | Stilp |
| 7,227,463 | B2 | 6/2007 | Merrell |
| 7,230,532 | B2 | 6/2007 | Albsmeier et al. |
| 7,355,515 | B2 | 4/2008 | Lee et al. |
| 7,753,418 | B2 | 7/2010 | Fleming |
| 8,193,935 | B2 | 6/2012 | Gates |
| 8,624,736 | B2 * | 1/2014 | Gore ................. G08B 13/04 292/38 |
| 2006/0192396 | A1 | 8/2006 | Frolov et al. |
| 2007/0080541 | A1 | 4/2007 | Fleming |
| 2007/0194914 | A1 | 8/2007 | Gates |
| 2016/0221501 | A1 * | 8/2016 | Linden ................. E05B 81/72 |

* cited by examiner

FENESTRATION UNIT MONITORING APPARATUS WITH TETHERS AND METHODS

RELATED APPLICATION

This application claims the benefit under 35 U.S.C. Section 119 of U.S. Provisional Patent Application Ser. No. 62/099,908 entitled "FENESTRATION UNIT MONITORING APPARATUS WITH TETHERS AND METHODS" and filed on Jan. 5, 2015, which is incorporated herein by reference in its entirety.

Fenestration unit monitoring apparatus with tethers and methods of installing the same are described herein.

Building security systems can vary in complexity from simple burglar alarms triggered by breakage of windows or other fenestration members, to comprehensive intrusion detection systems that collect data from video cameras, laser beams, infrared sensors, microphones, etc., analyze the data, and communicate information to a variety of destinations, such as security stations and automated building control centers.

Some examples of status monitoring apparatus that may be used to monitor the status of fenestration locks and the open or closed state of fenestration units are described in U.S. Pat. No. 8,624,736 to Gore et al. Although those devices, systems, and methods are useful, they typically require increasing the height of a lock assembly when retrofitting an existing fenestration unit lock assembly to include monitoring apparatus.

SUMMARY

The fenestration unit monitoring apparatus with tethers described herein are configured to retrofit an existing fenestration unit to incorporate components that are capable of monitoring the locked or unlocked status of the existing lock assembly and/or the panel position status of a movable panel of the fenestration unit.

The fenestration unit monitoring apparatus described herein may provide, in one or more embodiments, a relatively easy and aesthetically pleasing option to monitor the lock status and/or panel status of an existing fenestration unit with an existing lock assembly already located thereon.

In one or more embodiments, the fenestration unit monitoring apparatus described herein include a lock status sensor located on a tether such that the lock status sensor can be positioned within an existing fenestration unit lock assembly when a monitor housing of the fenestration unit monitoring apparatus is located on the fenestration unit adjacent the fenestration unit lock assembly.

In a first aspect, one or more embodiments of a fenestration unit monitoring apparatus configured for retrofitting an existing fenestration unit having a lock assembly mounted on a frame member of a fenestration unit panel as described herein may include: a monitor housing configured for mounting on a surface of the frame member of the fenestration unit panel; a controller located on a controller body within the monitor housing; a panel position sensor located in the monitor housing and operably connected to the controller, the panel position sensor configured to detect a selected position of the fenestration unit panel and provide a signal to the controller indicative of the selected position of the fenestration unit panel; a lock status sensor located outside of the monitor housing and operably connected to the controller through one or more conductors, wherein the one or more conductors extend from the controller body to the lock status sensor along a tether, and wherein the lock status sensor is configured to detect a status of a lock assembly on the fenestration unit panel. In one or more embodiments, the controller is configured to: receive a lock signal from the lock status sensor when the lock assembly is in a locked state; receive a panel position signal from the panel position sensor when the panel position sensor detects that the fenestration unit panel is in the selected position; and provide an indication of a status of one or both of the lock signal and the panel position signal.

In one or more embodiments of a fenestration unit monitoring apparatus as described herein, the tether comprises a sheet-form substrate, wherein the one or more conductors are located on or in the substrate. In one or more embodiments, the tether is rotatably attached to the controller body such that the tether is configured to rotate between a first position and a second position in a plane defined by a base of the monitor housing. In one or more embodiments, the lock status sensor remains operably connected to the controller through one or more conductors while the tether rotates between the first position and the second position.

In one or more embodiments of a fenestration unit monitoring apparatus as described herein, the tether comprises a standoff located between the monitor housing and the lock status sensor, wherein the tether is thicker in the area occupied by the standoff than in the areas not occupied by the standoff and wherein the one or more conductors do not extend through the area occupied by the standoff.

In one or more embodiments of a fenestration unit monitoring apparatus as described herein, the tether is configured to be located between a base of the lock assembly and the frame member on which the lock assembly is mounted such that the lock status sensor is positioned underneath the base of the lock assembly.

In one or more embodiments of a fenestration unit monitoring apparatus as described herein, the lock status sensor comprises a proximity sensor configured to detect the presence of a lock component of the lock assembly when the lock assembly is in the locked state.

In one or more embodiments of a fenestration unit monitoring apparatus as described herein, the lock status sensor comprises a magnetic switch mounted on the tether and a permanent magnet configured for attachment to the lock assembly on the fenestration unit panel, wherein the lock assembly moves the permanent magnet towards the magnetic switch when the lock assembly is moved into the locked state. In one or more embodiments, the permanent magnet is mounted in a magnet housing configured for attachment to a rotating component of the lock assembly, wherein the magnet housing and the magnet rotate with the rotating component of the lock assembly.

In one or more embodiments of a fenestration unit monitoring apparatus as described herein, the panel position sensor is attached to the controller body and operably connected to the controller through the controller body. In one or more embodiments, the panel position sensor comprises a magnetic switch. In one or more embodiments, the apparatus further comprises a plunger assembly separate and discrete from the monitor housing, wherein the plunger assembly is configured for insertion into a bore located in the frame member of the fenestration unit panel proximate the monitor housing. In one or more embodiments, the plunger assembly comprises: a plunger mounted for movement along a plunger axis within a plunger housing; a permanent magnet attached to the plunger such that the permanent magnet moves along the plunger axis with the plunger; and a biasing element located in the plunger housing, the biasing element exerting a biasing force moving the plunger to a first position in which the plunger extends out of the plunger housing, wherein the plunger is configured to move into a second position in the plunger housing along the plunger axis when the plunger is acted on by a force acting on the plunger against the biasing force. In one or more embodiments, the permanent magnet activates the magnetic switch when the plunger is in the second position but does not activate the magnetic switch when the plunger is in the first position.

In one or more embodiments of a fenestration unit monitoring apparatus as described herein, the apparatus further comprises a transmitter located on the controller body and operably connected to the controller, wherein providing an indication of the status of one or both of the lock signal and the panel position signal comprises actuating the transmitter to transmit one or more control signals, wherein the one or more control signals are indicative of the status of one or both of the lock signal and the panel position signal.

In a second aspect, one or more embodiments of a method of installing a fenestration unit monitoring apparatus on an existing fenestration unit having a lock assembly mounted on a frame member of a fenestration unit panel may include: attaching a monitor housing to the frame member of the fenestration unit panel, wherein the monitor housing comprises a controller located on a controller body within the monitor housing and a panel position sensor located in the monitor housing and operably connected to the controller, the panel position sensor configured to detect a selected position of the fenestration unit panel and provide a signal to the controller indicative of the selected position of the fenestration unit panel; and positioning a lock status sensor underneath a base of the lock assembly mounted on the frame member of the fenestration unit panel, a lock status sensor located outside of the monitor housing and operably connected to the controller through one or more conductors, wherein the one or more conductors extend from the controller body to the lock status sensor along a tether, and wherein the lock status sensor is configured to detect a status of a lock assembly on the fenestration unit panel. In one or more embodiments, the controller: receives a lock signal from the lock status sensor when the lock assembly is in a locked state; receives a panel position signal from the panel position sensor when the panel position sensor detects that the fenestration unit panel is in the selected position; and provides an indication of a status of one or both of the lock signal and the panel position signal.

In one or more embodiments of methods described herein, the tether comprises a sheet-form substrate, wherein the one or more conductors are located on or in the substrate.

In one or more embodiments of methods described herein, the tether is rotatably attached to the controller body, and attaching the monitor housing to the frame member comprises rotating the tether between a first position and a second position in a plane defined by a base of the monitor housing. In one or more embodiments, the lock status sensor remains operably connected to the controller through one or more conductors while rotating the tether between the first position and the second position.

In one or more embodiments of methods described herein, the tether comprises a standoff located between the monitor housing and the lock status sensor, wherein the tether is thicker in the area occupied by the standoff than in the areas not occupied by the standoff and wherein the one or more conductors do not extend through the area occupied by the standoff, and wherein positioning the lock status sensor underneath the base of the lock assembly comprises positioning an outer edge of the base of the lock assembly on the standoff.

In one or more embodiments of methods described herein, the lock status sensor comprises a proximity sensor, and wherein the lock status sensor detects the presence of a lock component of the lock assembly when the lock assembly is in the locked state.

In one or more embodiments of methods described herein, the lock status sensor comprises a magnetic switch mounted on the tether and a permanent magnet, wherein positioning the lock status sensor comprises attaching the permanent magnet to the lock assembly, wherein the lock assembly moves the permanent magnet towards the magnetic switch when the lock assembly is moved into the locked state. In one or more embodiments, the permanent magnet is mounted in a magnet housing, and wherein the method comprises attaching the magnet housing to a rotating component of the lock assembly, wherein the magnet housing and the magnet rotate with the rotating component of the lock assembly.

In one or more embodiments of methods described herein, the panel position sensor is attached to the controller body and operably connected to the controller through the controller body. In one or more embodiments, the panel position sensor comprises a magnetic switch. In one or more embodiments, the fenestration unit monitoring apparatus further comprises a plunger assembly separate and discrete from the monitor housing, and the method further comprises: forming a plunger bore in the frame member proximate the lock assembly, wherein the plunger bore is positioned proximate the panel position sensor in the monitor housing; inserting a plunger assembly into the plunger bore. In one or more embodiments, the plunger assembly comprises: a plunger mounted for movement along a plunger axis within a plunger housing; a permanent magnet attached to the plunger such that the permanent magnet moves along the plunger axis with the plunger; and a biasing element located in the plunger housing, the biasing element exerting a biasing force moving the plunger to a first position in which the plunger extends out of the plunger housing, wherein the plunger is configured to move into a second position in the plunger housing along the plunger axis when the plunger is acted on by a force acting on the plunger against the biasing force. In one or more embodiments, the permanent magnet activates the magnetic switch when the plunger is in the second position but does not activate the magnetic switch when the plunger is in the first position.

In one or more embodiments of methods described herein, the fenestration unit monitoring apparatus further comprises a transmitter located on the controller body and operably connected to the controller, wherein providing an indication of the status of one or both of the lock signal and the panel position signal comprises actuating the transmitter to transmit one or more control signals, wherein the one or more control signals are indicative of the status of one or both of the lock signal and the panel position signal.

As used herein and in the appended claims, the singular forms "a," "an," and "the" include plural referents unless the context clearly dictates otherwise. Thus, for example, reference to "a" or "the" component may include one or more of the components and equivalents thereof known to those skilled in the art. Further, the term "and/or" means one or all of the listed elements or a combination of any two or more of the listed elements.

It is noted that the term "comprises" and variations thereof do not have a limiting meaning where these terms appear in the accompanying description. Moreover, "a," "an," "the," "at least one," and "one or more" are used interchangeably herein.

Where used herein, the terms "top" and "bottom" are used for reference relative to each other when the fenestration units described herein are properly installed in a building opening.

Where used herein, the terms "exterior" and "interior" are used in a relative sense, e.g., an exterior edge and an interior edge of a sill or any other component describe edges located on opposite sides of the fenestration unit. In other words, an exterior edge could be found within the interior of a building or other structure that would conventionally define an interior and an exterior, while an interior edge could be found outside of a building or other structure that would conventionally define an interior and an exterior.

The above summary is not intended to describe each embodiment or every implementation of the fenestration unit monitoring apparatus and methods described herein. Rather, a more complete understanding of the invention will become apparent and appreciated by reference to the following Description of Illustrative Embodiments and claims in view of the accompanying figures of the drawing.

DESCRIPTION OF ILLUSTRATIVE EMBODIMENTS

In the following description of illustrative embodiments, reference is made to the accompanying figures of the drawing which form a part hereof, and in which are shown, by way of illustration, specific embodiments. It is to be understood that other embodiments may be utilized and structural changes may be made without departing from the scope of the present invention.

To facilitate an understanding and explanation of the invention, the elements and numerals as described herein may be referred to with the terms "upper," "lower," "top," "bottom," "front," and "back" to distinguish portions of the device. These conventions are merely included for ease of explanation and understanding and should not be construed as limiting in any manner. The descriptions of the parts detailed herein as "upper," "lower," etc. also can be referred to as "first," "second," etc.

The fenestration unit monitoring apparatus described herein may be used to monitor the lock status of a fenestration unit including a lock assembly and/or the open or closed status of a fenestration unit having a panel (e.g., door panel, window sash, etc.) that can be moved between an open position and closed position (whether through sliding motion or rotation). The fenestration unit monitoring apparatus can be used with a variety of different types of fenestration units including, but not limited to, casement windows, awning windows, hopper windows, basement/utility windows, roof windows, gliding windows, hinged patio doors, sliding patio doors, entry doors, garage doors, etc.

One illustrative embodiment of a fenestration unit monitoring apparatus 30 retrofitted to an existing lock assembly on a frame member 10 of a fenestration unit panel is depicted in, for example, FIGS. 1-4. The frame member 10 includes a lock assembly 20 having a lock assembly base 22 mounted on a surface of the frame member 10 and a latch 26 protruding from an edge 12 of the frame member 10 of the fenestration unit panel. The latch 26 may be withdrawn into the frame member 10 so that the fenestration unit panel can be moved to an open position by a knob, lever, etc. which is not shown in FIG. 1. The lock assembly 20 includes an actuator knob 24 which is used to move the lock assembly 20 between a locked and unlocked state. In one or more embodiments, the latch 26 of the lock assembly 20 cannot be withdrawn into the frame member 10 when the actuator knob 24 is rotated to place the lock assembly 20 in the locked state.

Figure 1:
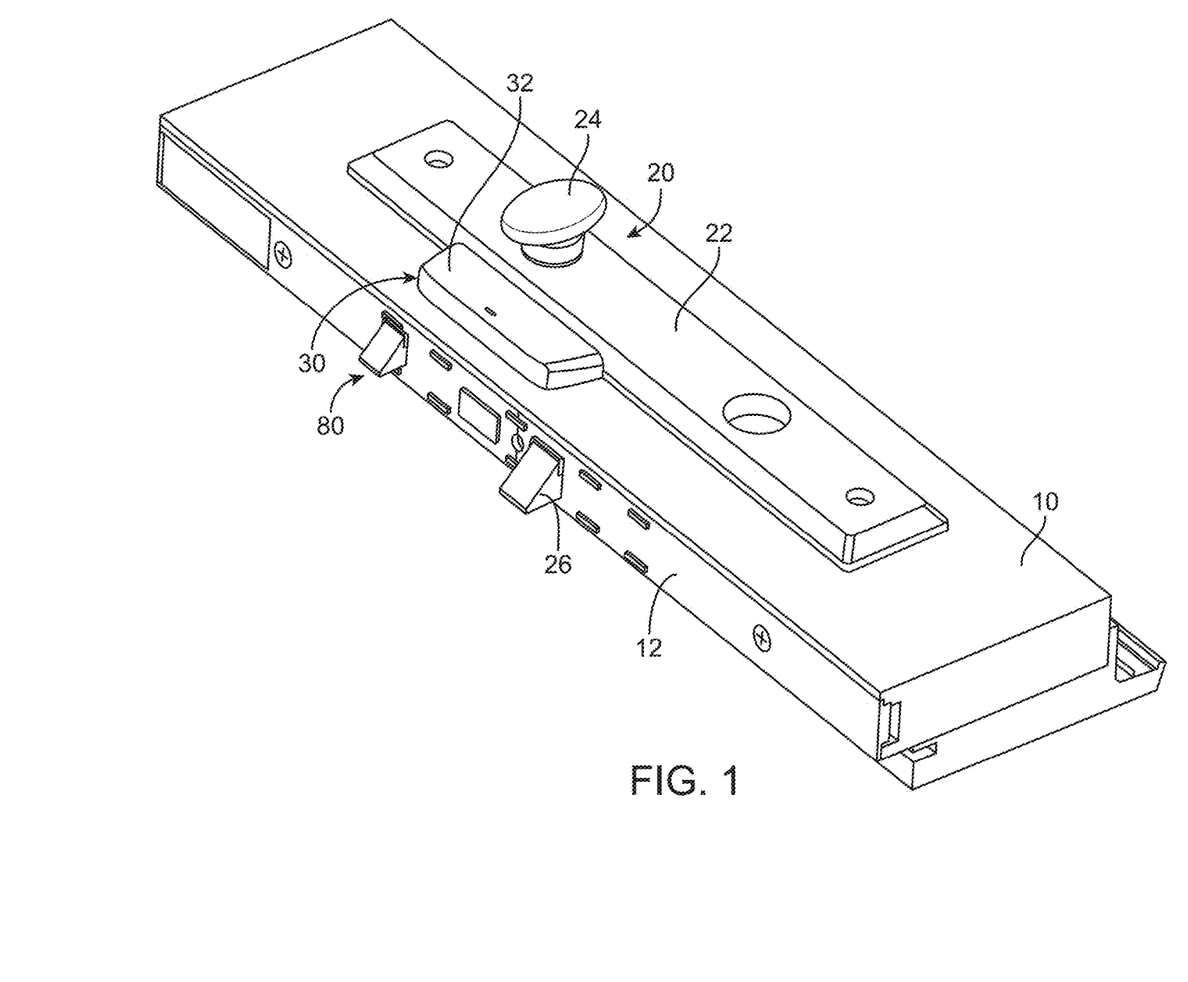
FIG. 1 is a perspective view of one illustrative embodiment of a frame member of a fenestration unit panel of a fenestration unit with one illustrative embodiment of a fenestration unit monitoring apparatus located thereon.

The fenestration unit monitoring apparatus 30 may, in one or more embodiments, include a monitor housing 32 mounted on the same surface of the frame member 10 as the base 22 of the lock assembly 20. In one or more embodiments, the fenestration unit monitoring apparatus 30 may include a trigger component 80 which, in the depicted illustrative embodiment, is in the form of a plunger assembly which will be described in more detail in connection with FIGS. 6A-6B. Although the monitor housing 32 of the fenestration unit monitoring apparatus 30 is depicted as being mounted between the edge 12 of the frame member 10 and the base 22 of the lock assembly 20, in one or more alternative embodiments the monitor housing 32 may be positioned elsewhere on the frame member 10, e.g., above or below the base 22 of the lock assembly 20, on the opposite side of the base 22 of the lock assembly 20, etc.

Figure 2:
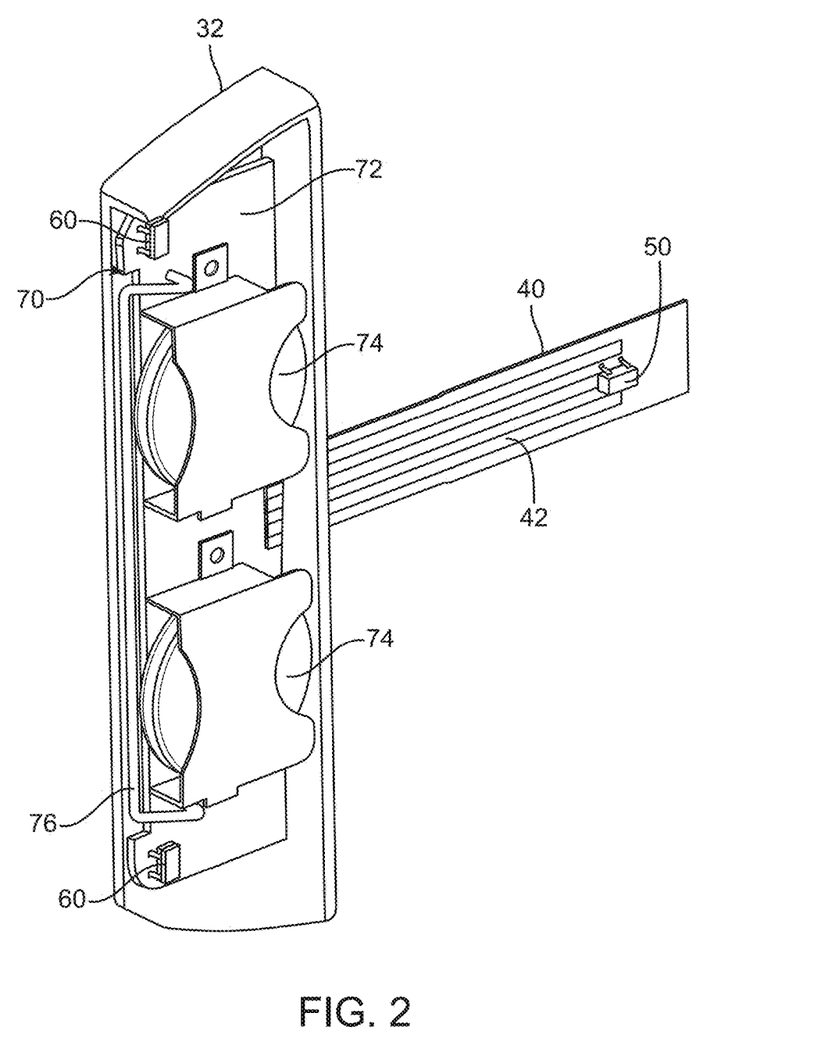
FIG. 2 is a perspective view of the illustrative embodiment of fenestration unit monitoring apparatus of FIG. 1 removed from the frame member.

The illustrative embodiment of fenestration unit monitoring apparatus 30 is depicted in FIG. 2 removed from the frame member 10 with a cover removed from the monitor housing 32 to expose interior components located within the monitor housing 32. Also visible in the view of FIG. 2 is a tether 40 which extends outside of the monitor housing 32 and which, in one or more embodiments, is located between the base 22 of the lock assembly 20 and surface of the frame member 10 on which the lock assembly 20 is mounted.

The illustrative embodiment of fenestration unit monitoring apparatus 30 includes a lock status sensor 50 positioned on the tether 40 such that, when the fenestration unit monitoring apparatus 30 is in position on a frame member 10 of a fenestration unit panel along with lock assembly 20, the tether 40 extends underneath the base 22 of the lock assembly 20 such that the lock status sensor 50 is positioned underneath the base 22 of the lock assembly 20.

The tether 40 of the fenestration unit monitoring apparatus described herein may, in one or more embodiments, include one or more electrical conductors 42 used to operably connected the lock status sensor 52 a controller 70 located in the monitor housing 32. The one or more electrical conductors 42 may take the form of conductive traces, wires, ribbons, etc. that are attached to, positioned on, contained within or otherwise connected to the tether 40 in any suitable manner.

In one or more embodiments, the one or more conductors 42 extend from a controller body 72 which may be in the form of, e.g., a printed circuit board or other suitable substrate the can be used to connect the one or more conductors extending to the lock status sensor 50 to a controller 70 located on the controller body 72 such that lock status signals generated by the lock status sensor 50 can be delivered to the controller 70 located on the controller body 72.

The controller 70 of the illustrative embodiment of fenestration unit monitoring apparatus 30 may include a variety of other components, some of which are depicted in the view of FIG. 2. For example, the depicted illustrative embodiment of fenestration unit monitoring apparatus 30 includes a pair of power sources 74 used to provide power to the components of the fenestration unit monitoring apparatus 30. Although the depicted embodiment includes a pair of power sources 74, in one or more alternative embodiments the fenestration unit monitoring apparatus may include only one power source 74. In one or more embodiments, the power sources 74 may be in the form of a battery, although other power sources may be used, e.g., capacitive power sources, etc. The depicted illustrative embodiment of fenestration unit monitoring apparatus 30 also includes an antenna 76 located in the monitor housing 32 which may be used, as described herein, to transmit one or more signals are indicative of status of the fenestration unit monitoring apparatus 30. Although the depicted illustrative embodiments include only one antenna, one or more alternative embodiments may include two or more antennas. In still other alternative embodiments, the antenna or antennas may be located outside of the monitor housing of a fenestration unit monitoring device as described herein.

The depicted illustrative embodiment of fenestration unit monitoring apparatus 30 also includes a panel position sensor 60 located in the monitor housing 32. In one or more embodiments, the panel position sensor 60 may be located on the controller body 72 along with the controller 70 and is operably connected to the controller 70 through the controller body 72. As described herein, the panel position sensor 60 may, in one or more embodiments, be configured to detect a selected position of the fenestration unit panel of which frame member 10 forms a part. In particular, the panel position sensor 60 may, in one or more embodiments detect when the fenestration unit panel containing frame member 10 is in an open or closed state with respect to a frame in which the fenestration unit panel is located. In other words, the panel position sensor can detect whether, for example, a door is open or closed.

In the depicted illustrative embodiment of fenestration unit monitoring apparatus 30 the controller body 72 located in monitor housing 32 includes duplicate components, e.g., a pair of panel position sensors 60 such that the monitor housing 32 can be provided in a right or left hand orientation on a fenestration unit panel while still positioning a panel position sensor 60 in a location that is suitable for monitoring fenestration unit panel status as described herein. In one or more alternative embodiments, however, fenestration unit monitoring apparatus 30 described herein may or may not include duplicate components.

The illustrative embodiment of tether 40 depicted in, e.g., FIG. 2 may be described as being in the form of a sheet-form substrate. In other words, the tether 40 may have a width and length substantially greater than its thickness, where thickness is measured in a direction transverse to the surface of the fenestration unit panel frame member on which the tether 40 is located. In one or more embodiments, the tether 40 may be provided in the form of a flexible electrical connector as is commonly used in many electronic devices. As described herein, the one or more conductors 42 may be located on or in the substrate that forms the tether 40.

As described herein, a lock status sensor 50 is, in one or more embodiments, positioned on the tether 40 outside of the monitor housing 32 of the fenestration unit monitoring apparatus 30. The lock status sensor 50 is, in one or more embodiments, configured to detect when the lock assembly 20 of a fenestration unit panel on which the fenestration unit monitoring apparatus 30 is located is in a locked state. In one or more embodiments, the lock status sensor 50 may be in the form of a proximity sensor configured to detect the presence of one or more lock components of the lock assembly 20 when the lock assembly 20 is in the locked state.

The lock status sensor 50 may, in one or more embodiments, be configured to detect the presence of a trigger component that, when positioned near the lock status sensor 50, provides an indication that the lock assembly 20 is in the locked state. In the illustrative embodiment depicted in, e.g., FIGS. 3-4, the fenestration unit monitoring apparatus 30 may include a magnet housing 52 configured for attaching to a component of the lock assembly 20 which moves a trigger component 54 of the housing 52 towards and away from the lock status sensor 50 as the lock assembly 20 is moved into and out of its locked state. In the depicted illustrative embodiment, the trigger component 54 is moved closer to or away from the lock status sensor 50 when actuator 28 of the lock assembly 20 rotates about axis 21 (with the actuator 28 being moved by knob 24 as seen in, e.g., FIG. 1).

In one or more embodiments, the lock status sensor 50 may be in the form of a magnetic switch (e.g., a magnetic reed switch, Hall Effect sensor, etc.) and trigger component 54 may be in the form of a permanent magnet. As the actuator 28 rotates about axis 21 when the lock assembly is moved into and out of its locked state, the trigger component 54 moves towards and away from the lock status sensor 50. In particular, the trigger component 54 is in a location that is not associated with a locked state of the lock assembly 20 in FIG. 3, but is in a position nearer to the lock status sensor 50 after rotation of the actuator 28 about axis 21 which is associated with a locked state of the lock assembly 20 of the fenestration unit panel.

Figure 3:
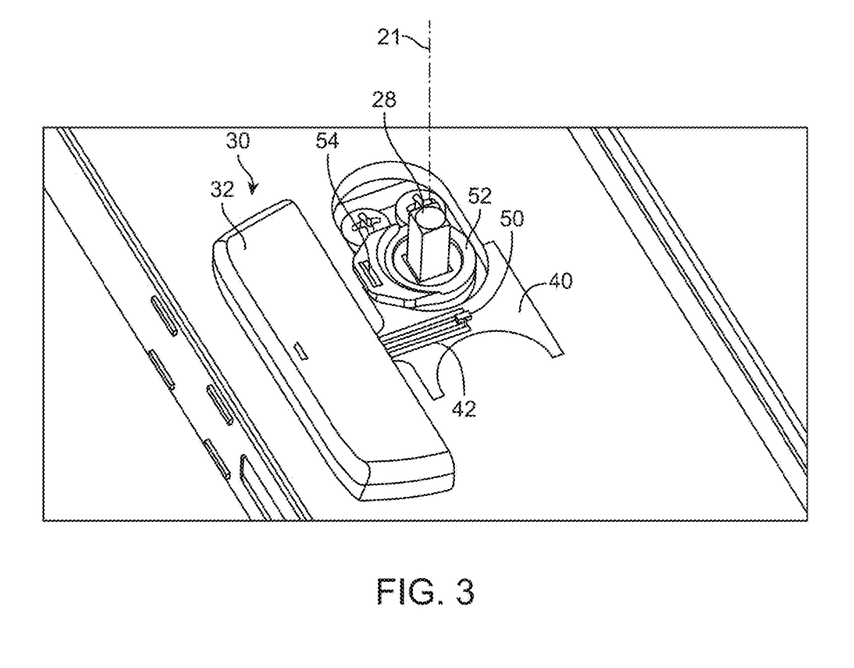
FIG. 3 is a perspective view of the fenestration unit monitoring apparatus of FIGS. 1 and 2 in combination with another illustrative embodiment of a tether and a trigger component attached to the lock assembly of the fenestration unit.
Figure 4:
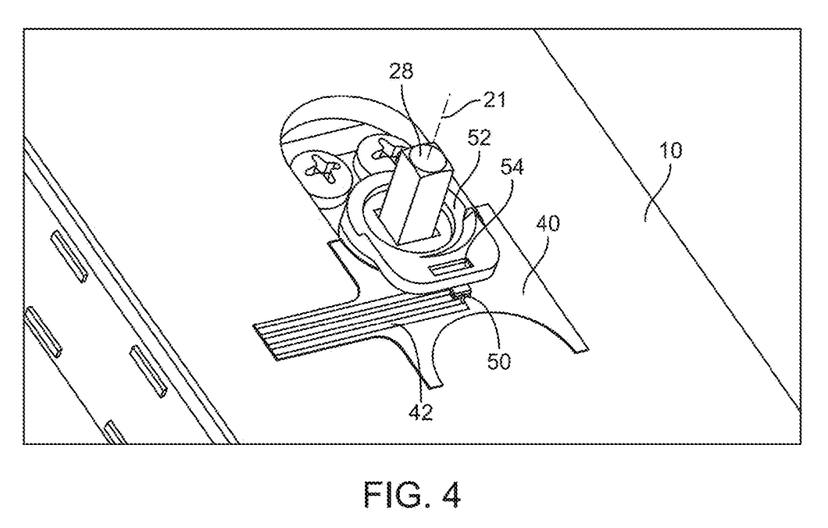
FIG. 4 depicts the trigger component and lock status sensor of FIG. 3 in a position relative to each other that may be associated with a locked state of the lock assembly.

Although the illustrative embodiment of the lock status sensor depicted in FIGS. 2-4 is in the form of a magnetic switch that is configured to sense a trigger in the form of a permanent magnet, the lock status sensors used in connection with a fenestration unit monitoring apparatus described herein may be provided in any suitable form that may or may not require a separate trigger to detect the position of a lock arm, e.g., an electro-mechanical switch (e.g., microswitch, etc.), an acoustical sensor, an RFID device, an optical sensor, a capacitive sensor, direct electrical contacts (e.g., in which one or more components of the lock assembly span a pair of contacts to complete a circuit), etc.

In one or more embodiments of the fenestration unit monitoring apparatus 30 as described herein, the tether may include a structure designed to protect the one or more conductors of the tether from damage by the base of a lock assembly under which the tether extends. Referring to, e.g., FIG. 5 which is an enlarged cross-sectional view of one alternative embodiment of a tether 140 positioned on the surface of a frame member 110 and passing underneath an edge 133 of a monitor housing 132, the tether 140 may include one or more standoffs 144 which can be used to protect one or more conductors 142 on the tether 140. In one or more embodiments, the one or more conductors 142 on the tether 140 are protected by the standoffs 144 when the standoffs 144 are configured to raise the edge 133 of the monitor housing 132 above the one or more conductors 142 on the tether 140. In one or more embodiments, the standoffs 144 configured to raise the edge 133 of the monitor housing 132 because the tether 140 is thicker in the area occupied by the one or more standoffs 144 than in the areas that are not occupied by the standoffs 144. In one or more embodiments, the one or more conductors 142 do not extend through the area on the tether 140 that are occupied by the one or more standoffs 144.

Figure 5:
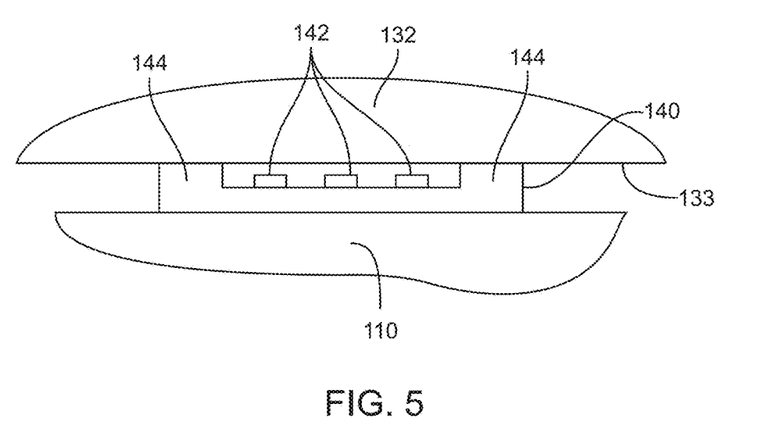
FIG. 5 is an enlarged cross-sectional view of a portion of another illustrative embodiment of a tether that may be used with the fenestration unit monitoring apparatus described herein.

Although the one or more standoffs 144 are depicted in FIG. 5 as being integral with the tether 140, in one or more alternative embodiments, the one or more standoffs 144 may be in the form of separate and discrete articles attached to your position on the tether 140 and configured to raise the edge 133 of the monitor housing 132 above the one or more conductors 142.

As described herein, one or more embodiments of the fenestration unit monitoring apparatus may include a lock status sensor capable of detecting when a lock assembly on the fenestration unit panel is in a locked state. In some instances, however, the lock assembly may be in its locked state, but the fenestration unit panel may not be in a position in which the fenestration unit panel is, itself, locked in the closed position.

To address that potential issue, the fenestration unit monitoring apparatus described herein may include a panel position sensor that is configured to detect the position of a fenestration unit panel on which the fenestration unit monitoring apparatus is located. Indication that a fenestration unit panel is in a position associated with a closed position, will, when combined with an indication that a lock assembly is in a locked state, provide an indication that the fenestration unit panel is both closed and locked.

In the illustrative embodiment of fenestration unit monitoring apparatus 30 described herein, a panel position sensor 60 is attached to the controller body 72 located in the monitor housing 32. The panel position sensor 60 may, in one or more embodiments, take the form of any suitable sensor such as, e.g., an electro-mechanical switch (e.g., microswitch, etc.), an acoustical sensor, an RFID device, an optical sensor, a capacitive sensor, direct electrical contacts (e.g., in which one or more components of the lock assembly span a pair of contacts to complete a circuit), etc.

In the depicted illustrative embodiment of fenestration unit monitoring apparatus 30, however, the panel position sensor 60 is in the form of a magnetic switch (e.g., a magnetic reed switch, Hall Effect sensor, etc.) which, as a result, requires a trigger component to provide an indication that a fenestration unit panel is in a close or open position. In one or more embodiments, a trigger component in the form of a permanent magnet could potentially be mounted directly on a frame in which the fenestration unit panel is located or on another fenestration unit panel which, when in a selected position with reference to the panel on which the fenestration unit monitoring apparatus is located, would provide an indication that the fenestration unit is closed. Such an arrangement may, however, not be possible due to, e.g., distance between the trigger component and the panel position sensor, potential for dislodgement of the permanent magnet, aesthetic reasons, etc.

In one or more embodiments, a panel position sensor trigger component may be in the form of a plunger assembly in which a permanent magnet moves in response to the position of a sash/panel of the fenestration unit. The plunger assembly may, in one or more embodiments, be mounted in a bore located in the frame member of the fenestration unit panel on which the fenestration unit monitoring apparatus is located.

Figure 6A:
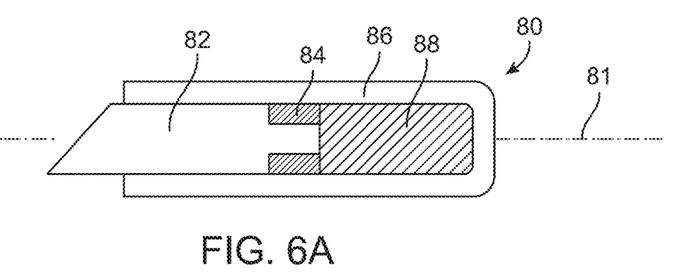
FIG. 6A is a cross-sectional view of one illustrative embodiment of a plunger assembly that may be used in connection with a fenestration unit monitoring apparatus as described herein.
Figure 6B:
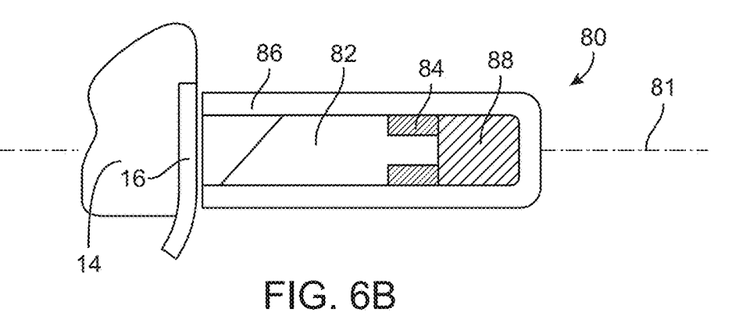
FIG. 6B is a cross-sectional view of the plunger assembly of FIG. 6A, with the plunger assembly moved to a second position as described herein.

One illustrative embodiment of a plunger assembly that may be used in connection with the fenestration unit monitoring apparatus described herein is depicted in, e.g., the cross-sectional views of FIGS. 6A and 6B. The illustrative embodiment of plunger assembly 80 includes a plunger 82 on or in which a permanent magnet 84 is mounted. The plunger 82 is mounted for movement along a plunger axis 81 within a plunger housing 86 such that the permanent magnet 84 moves towards or away from a panel position sensor of the fenestration unit monitoring apparatus depending on the position of the plunger 82.

In one or more embodiments, the plunger assembly 80 includes a biasing element 88 located within the housing 86 of the plunger assembly 80. The biasing element 88 exerts a biasing force moving the plunger 82 (and, therefore, permanent magnet 84) to a first position in which the plunger 82 extends out of the housing 86 as seen in, e.g., FIG. 6A.

The plunger 82 is configured to move into a second position in the housing 86 along the plunger axis 81 when the plunger 82 is acted on by a force which acts on the plunger 82 against the biasing force provided by the biasing element 88. The plunger 82 is depicted in one embodiment of a second position in the housing 86 in the view seen in FIG. 6B because the plunger 82 is acted on by the frame member 14 of, e.g., a frame in which the fenestration unit panel is located. In particular, the plunger 82 moves into the second position as the panel in which plunger assembly 80 is located contacts a strike plate 16 attached to the frame member 14. That contact may, in one or more embodiments, move the plunger 82 to the second position as depicted in FIG. 6B. Comparing the position of the permanent magnet 84 when the plunger 82 is in the first and second positions as seen in FIGS. 6A and 6B illustrates how the permanent magnet 84 moves along the plunger axis 81 against the biasing force provided by biasing element 88.

Although not depicted in the same view, it will be understood that the permanent magnet 84 is located closer to the panel position sensor 60 in monitor housing 32 of fenestration unit monitoring apparatus 30 when the plunger 82 is in the second position as depicted in FIG. 6B which is associated with the fenestration unit panel of frame member 10 being in a closed position within a frame in which the fenestration unit panel is located. With the permanent magnet 84 located closer to the panel position sensor 60 when in its second position, the panel position sensor 60 is, in one or more embodiments, configured to provide a signal to, e.g., a controller 70 indicating that fenestration unit panel is located in a closed position in a fenestration unit. In one or more embodiments in which the panel position sensor 60 is in the form of a magnetic switch, the permanent magnet 84 of the plunger assembly 80 may be described as activating the magnetic switch when the plunger 82 is in the second position of FIG. 6B, but the permanent magnet 84 does not activate the magnetic switch when the plunger 82 is in the first position as seen in FIG. 6A.

The illustrative embodiment of plunger assembly 80 depicted in FIGS. 6A and 6B may be useful in connection with a fenestration unit panel designed to rotate into and out of a closed position, see, e.g., the fenestration unit panel depicted in FIG. 1 where the frame member 10 includes a bore in edge 12 in which the plunger assembly 80 is located. One illustrative alternative embodiment of a plunger assembly 180 that may be useful in applications in which the fenestration unit panel does not rotate into position but, rather, slides into a closed position as in, e.g., a gliding door or window, is depicted in the cross-sectional view of FIG. 7.

Figure 7:
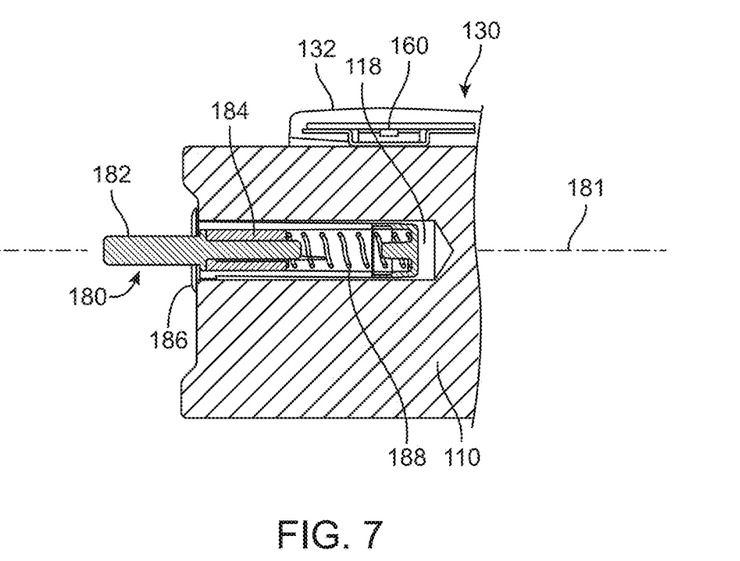
FIG. 7 is a cross-sectional view of another illustrative embodiment of a plunger assembly and a fenestration unit monitoring apparatus on a frame member of a fenestration unit panel as described herein.

The plunger assembly 180 is located within a bore 118 in the frame member 110. Plunger assembly 180 includes a plunger 182 having a permanent magnet 184 mounted thereon with the plunger 182 and magnet 184 located within a plunger housing 186. The plunger 182 is biased into a first position by a biasing element 188 which is also located in the plunger housing 186. Also depicted in FIG. 7 is a monitor housing 132 of a fenestration unit monitoring apparatus 130. A panel position sensor 160 is located within the monitor housing 130. Movement of the plunger 182 to the right along plunger axis 181 moves the magnet 184 on plunger 182 closer to the panel position sensor 160 and can, therefore, be used to provide an indication that the fenestration unit panel of which frame member 110 forms a part is in a closed position with respect to, e.g., a side jamb, other panel, etc.

In one or more embodiments, the biasing elements used in plunger assemblies as described herein may be provided in the form of a coil spring as depicted in, e.g., FIGS. 6A, 6B, and 7, although biasing elements used in plunger assemblies of fenestration unit monitoring apparatus as described herein may take a variety of forms including, e.g., compressible foams, compressible rubber, elastomers, leaf springs, compressible bladders, etc.

Retrofitting an existing fenestration unit to incorporate a trigger component for a panel position sensor of a fenestration unit monitoring apparatus as described herein may pose potential difficulties and/or results and aesthetically unpleasing placement of components or require modification of a sash/panel and/or frame members of the fenestration unit which could potentially result in voiding of a warranty on the fenestration unit. The illustrative embodiments of plunger assemblies described herein may, however, provide an opportunity for retrofitting of an existing fenestration unit in a manner that does not void a manufacturer's warranty and which also provides an aesthetically acceptable yet functional arrangement.

Figure 8:
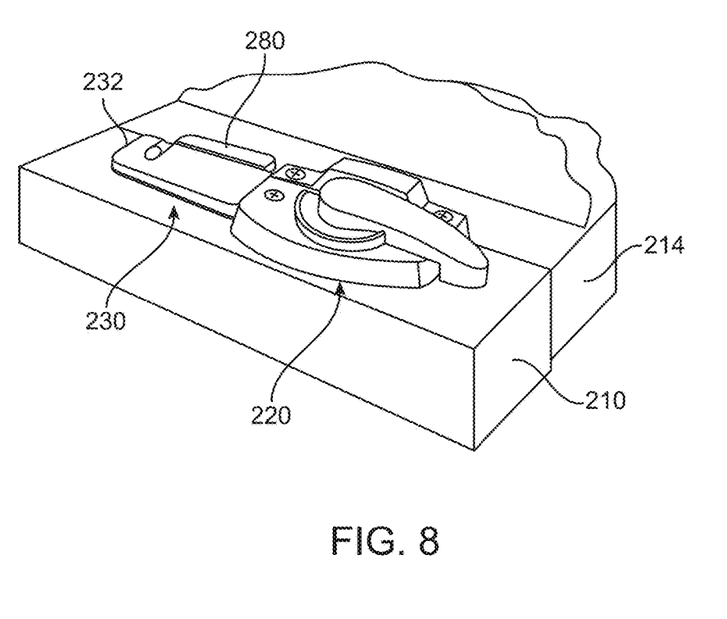
FIG. 8 is a perspective view of another illustrative embodiment of a fenestration unit monitoring apparatus located on a fenestration unit proximate a lock assembly as described herein.
Figure 9:
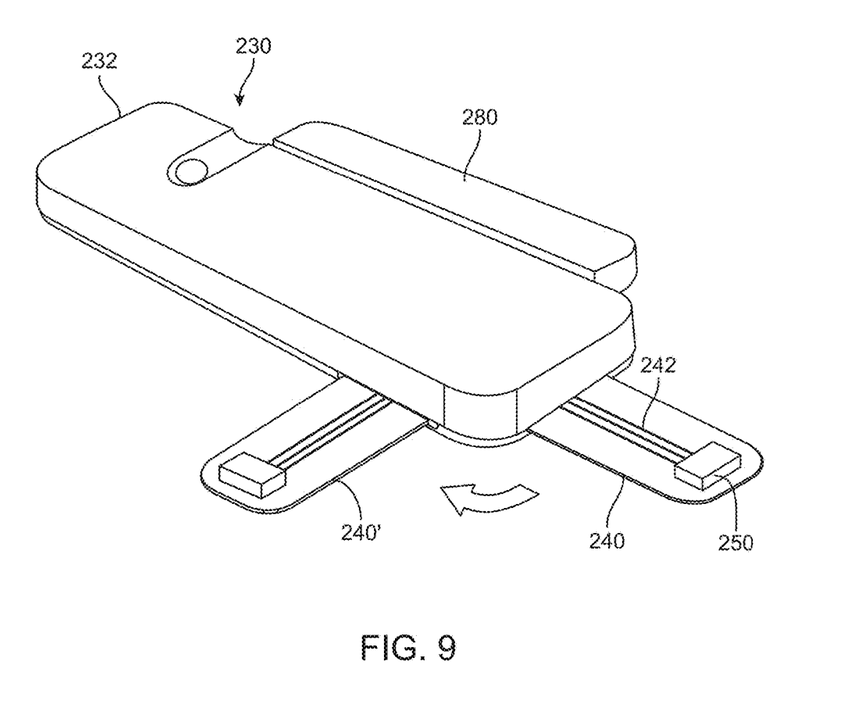
FIG. 9 is a perspective view of the fenestration unit monitoring apparatus of FIG. 8 illustrating rotation of a tether associated with the fenestration unit monitoring apparatus as described herein.

One alternative illustrative embodiment of a fenestration unit monitoring apparatus 230 as described herein is depicted in connection with FIGS. 8 and 9. The fenestration unit monitoring apparatus 230 is depicted as mounted on a frame member 210 of a fenestration unit panel which may be in the form of, e.g., a check rail on a sash in, e.g., a double hung or single hung window. The frame member 210 is positioned proximate a frame member 214 of a number panel in the fenestration unit which, in one or more embodiments, may be a bottom rail of a second sash that forms a part of the fenestration unit on which the fenestration unit monitoring apparatus 230 is located. The fenestration unit panels include components of a lock assembly 220 used to lock the frame members 210 and 214 and, therefore, their respective fenestration unit panels, in a closed position as is well known in the art.

In one or more embodiments, the fenestration unit monitoring apparatus 230 may be used to detect when the lock assembly 220 is in a locked state by positioning the housing 232 of the fenestration unit monitoring apparatus 230 near the lock assembly 220 and extending a tether 240 (see, e.g., FIG. 9) underneath a base of the lock assembly 220 in a manner similar to that described herein with respect to other illustrative embodiments of fenestration unit monitoring apparatus. The tether 240 may include, in one or more embodiments, a lock status sensor 250 (see, e.g., FIG. 9) positioned underneath the lock assembly 220 which may include a trigger component that interacts with the lock status sensor 252 provide an indication that the lock assembly 220 is in a locked state.

The fenestration unit monitoring apparatus 230 may also include a panel position sensor located within the housing 232 which may be configured to detect a trigger component 280 mounted on frame member 214. Detection of the trigger component 280 by the panel position sensor located within fenestration unit monitoring apparatus 230 may be used to provide an indication that the fenestration unit panels of which frame members 210 and 214 form a part are in positions associated with a closed state for the fenestration unit.

One optional feature depicted in connection with the illustrative embodiment of fenestration unit monitoring apparatus 230 is the construction and arrangement of tether 240. Similar to the other illustrative embodiments described herein, the tether 240 is used to position lock status sensor 250 underneath, e.g., lock assembly 220, and which includes one or more conductors 242 to operably connect the lock status sensor 250 on the tether 240 to a controller located within the monitor housing 232. The optional feature depicted in FIG. 9 is that the tether 240 may, in one or more embodiments, be rotatably attached to the controller body 232 such that the tether 240 is configured to rotate between a first position and a second position in a plane defined by a base of the monitor housing 232. This rotation is depicted by the arrow provided in FIG. 9 as well as the tether 240' also depicted in FIG. 9.

In one or more embodiments, the lock status sensor 250 located on tether 240 may remain operably connected to a controller located within monitor housing 232 while the tether 240 rotates between the first position and the second position. In one or more alternative embodiments, however, the tether 240 may not be constructed such that the lock status sensor 250 remains operably connected to a controller. In other words, the tether 240 may be disconnected or detached from the monitor housing 232 while in, e.g., the first position and reconnected or reattached to the monitor housing 232 in a selected second position. Although the tether 240 is depicted as rotating approximately 90° in one direction between the first and second positions seen in FIG. 9, it will be understood that the tether of a fenestration unit monitoring apparatus as described herein may be designed for rotation about any selected range and/or in any selected direction as needed.

The fenestration unit monitoring apparatus described herein may include a variety of components. A schematic block diagram including some of the many different components that may be included in the fenestration unit monitoring apparatus described herein is provided in FIG. 10. As seen there, the fenestration unit monitoring apparatus 330 may include a controller 370 which may be operably connected to a power source 374 as described herein. The controllers used in the fenestration unit monitoring apparatus described herein may be provided in any suitable form and may, for example, include memory and a control unit. In one or more embodiments, the control unit of a controller may, for example, be in the form of one or more microprocessors, Field-Programmable Gate Arrays (FPGA), Digital Signal Processors (DSP), microcontrollers, Application Specific Integrated Circuit (ASIC) state machines, etc.

Figure 10:
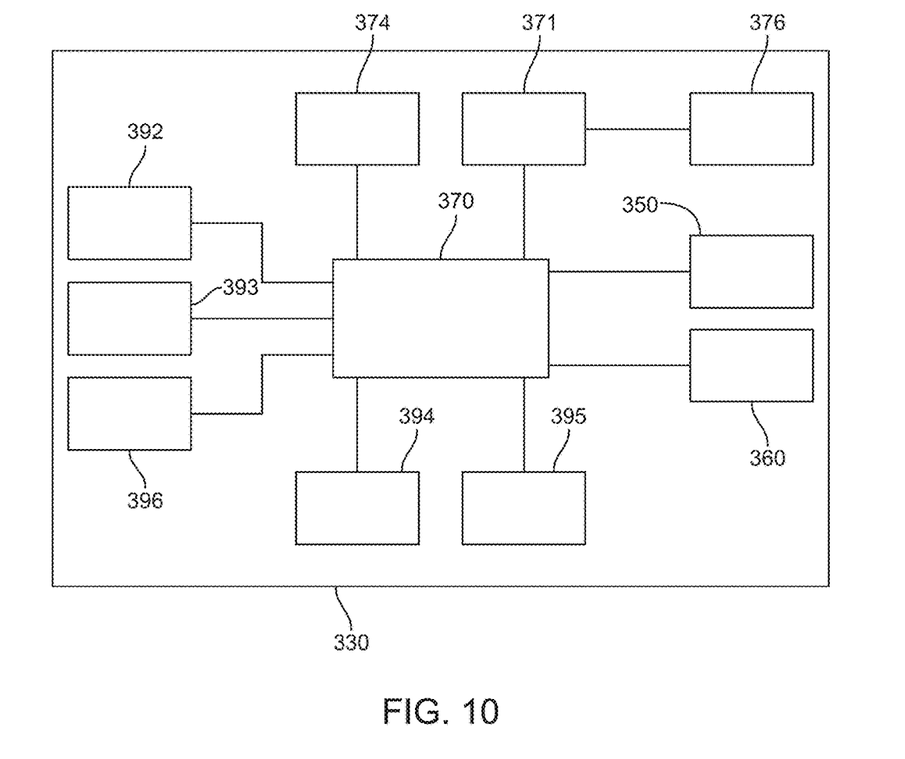
FIG. 10 is a schematic block diagram of one illustrative embodiment of a fenestration unit monitoring apparatus controller and associated devices which may be provided as part of the fenestration unit monitoring apparatus as described herein.

Other components depicted in this diagram include a lock status sensor 350 and panel position sensor 360, both of which are, in one or more embodiments, operably connected to the controller 370. Although only the controller 370 is depicted as being operably connected to the power source 374, in one or more alternative embodiments the power source 374 may be directly connected to any of the other components of the fenestration unit monitoring apparatus described herein which require power in which may use that power without having the power routed through the controller 370.

Also seen in the diagram of FIG. 10 is a transmitter 371 operably connected to the controller 370 and the antenna 376. The transmitter 371 may be used to transmit one or more codes, control signals, etc. indicative of the status of one or more of the signals received by the controller 370 from the various sensors and other devices that may be included in the fenestration unit monitoring apparatus described herein. Potential examples of some codes, control signals, etc. that may be provided using the transmitter 371 and antenna 376 may be described in, e.g., U.S. Pat. No. 8,624,736 to Gore et al. In one or more embodiments, the transmissions may take place using a smart phone or other control wireless control device through any suitable wireless communication protocol (e.g., Bluetooth, ZigBee, a wireless local area network (WLAN), etc.), etc.

Other optional components that may be included in the fenestration unit monitoring apparatus described herein may include one or more lights 392 (used to, e.g., indicate status, etc. of one or more of the sensors and/or the apparatus as a whole), sonic devices 393 which may be used to generate and/or detect sonic energy (e.g., speakers, microphones, etc.), one or more displays 394 which may be used to display alphanumeric or other information (e.g. LCD displays, etc.), a tamper switch 395 (used to detect if the fenestration unit monitoring apparatus has been removed or otherwise tampered with), and miscellaneous sensors 396 which may include, but are not limited to, temperature sensors, humidity sensors, light sensors, moisture sensors, UV light sensors, wind speed detectors, etc.

Although the fenestration unit monitoring apparatus described herein may be used in isolation, i.e., to monitor the status of a single fenestration unit, one or more of the fenestration unit monitoring apparatus described herein may be incorporated into a system which is configured to monitor multiple fenestration units having one or more fenestration unit monitoring apparatus as described herein mounted thereon. Examples of such systems may be described in, e.g., U.S. Pat. No. 8,624,736 to Gore et al. As discussed herein, the fenestration unit monitoring apparatus described herein may be particularly advantageous when installed to monitor status of an existing fenestration unit. In one embodiment of a method of installing a fenestration unit monitoring apparatus having a lock assembly mounted on a frame member of a fenestration unit panel as described herein, the method may include (with reference to, e.g., the illustrative embodiment of fenestration unit monitoring apparatus depicted in FIGS. 1-4): attaching a monitor housing 32 to the frame member 10 of the fenestration unit panel, wherein the monitor housing 32 includes a controller 70 located on a controller body 72 within the monitor housing 32 and a panel position sensor 60 located in the monitor housing 32 and operably connected to the controller 70. The panel position sensor 60 may be configured to detect a selected position of the fenestration unit panel and provide a signal to the controller 70 indicative of the selected position of the fenestration unit panel. The method may further include positioning a lock status sensor 50 underneath a base 22 of the lock assembly 20 mounted on the frame member 10 of the fenestration unit panel. The lock status sensor 50 is located outside of the monitor housing 32 and operably connected to the controller 70 through one or more conductors 42. The one or more conductors 42 extend from the controller body 72 to the lock status sensor 50 along a tether 40. The lock status sensor 50 is configured to detect a status of a lock assembly 20 on the fenestration unit panel. The controller 70 may, in one or more embodiments, receive a lock signal from the lock status sensor when the lock assembly is in a locked state; receive a panel position signal from the panel position sensor when the panel position sensor detects that the fenestration unit panel is in the selected position; and provide an indication of a status of one or both of the lock signal and the panel position signal.

In one or more embodiments, the tether may be rotatably attached to the controller body, and attaching the monitor housing to the frame member may include rotating the tether between a first position and a second position in a plane defined by a base of the monitor housing.

In one or more embodiments of the methods described herein the panel position sensor may be in the form of a magnetic switch and the method of installing the fenestration unit monitoring apparatus described herein may include, for example, forming a plunger bore in a frame member proximate the panel position sensor provided in the monitor housing. The method may further include, in one or more embodiments, inserting a plunger assembly into a plunger bore provided in the frame member on which the monitor housing of the fenestration unit monitoring apparatus is located. In one or more embodiments, the plunger assembly may include a plunger, a permanent magnet attached to the plunger and a biasing element as described herein.

The complete disclosure of the patents, patent documents, and publications identified herein are incorporated by reference in their entirety as if each were individually incorporated. To the extent there is a conflict or discrepancy between this document and the disclosure in any such incorporated document, this document will control.

Illustrative embodiments of the fenestration unit monitoring apparatus and methods are discussed herein some possible variations have been described. These and other variations and modifications in the invention will be apparent to those skilled in the art without departing from the scope of the invention, and it should be understood that this invention is not limited to the illustrative embodiments set forth herein. Accordingly, the invention is to be limited only by the claims provided below and equivalents thereof. It should also be understood that this invention also may be suitably practiced in the absence of any element not specifically disclosed as necessary herein.

What is claimed is:

1. A fenestration unit monitoring apparatus configured for retrofitting an existing fenestration unit having a lock assembly mounted on a frame member of a fenestration unit panel, the fenestration unit monitoring apparatus comprising:
   a monitor housing configured for mounting on a surface of the frame member of the fenestration unit panel;
   a controller located on a controller body within the monitor housing;
   a panel position sensor located in the monitor housing and operably connected to the controller, the panel position sensor configured to detect a selected position of the fenestration unit panel and provide a signal to the controller indicative of the selected position of the fenestration unit panel;
   a lock status sensor located on a tether, wherein the lock status sensor is located outside of the monitor housing and operably connected to the controller through one or more conductors, wherein the one or more conductors extend from the controller body to the lock status sensor along the tether, wherein the tether is configured to be located between a base of the lock assembly and the frame member on which the lock assembly is mounted such that the lock status sensor is positioned underneath the base of the lock assembly, and wherein the lock status sensor is configured to detect a status of a lock assembly on the fenestration unit panel;
   wherein the controller is configured to:
      receive a lock signal from the lock status sensor when the lock assembly is in a locked state;
      receive a panel position signal from the panel position sensor when the panel position sensor detects that the fenestration unit panel is in the selected position; and
      provide an indication of a status of one or both of the lock signal and the panel position signal.

2. An apparatus according to claim 1, wherein the tether comprises a sheet-form substrate, wherein the one or more conductors are located on or in the substrate.

3. An apparatus according to claim 2, wherein the tether is rotatably attached to the controller body such that the tether is configured to rotate between a first position and a second position in a plane defined by a base of the monitor housing.

4. An apparatus according to claim 3, wherein the lock status sensor remains operably connected to the controller through one or more conductors while the tether rotates between the first position and the second position.

5. An apparatus according to claim 2, wherein tether comprises a standoff located between the monitor housing and the lock status sensor, wherein the tether is thicker in the area occupied by the standoff than in the areas not occupied by the standoff and wherein the one or more conductors do not extend through the area occupied by the standoff.

6. An apparatus according to claim 1, wherein the lock status sensor comprises a proximity sensor configured to detect presence of a lock component of the lock assembly when the lock assembly is in the locked state.

7. An apparatus according to claim 1, wherein the lock status sensor comprises a magnetic switch mounted on the tether and a permanent magnet configured for attachment to the lock assembly on the fenestration unit panel, wherein the lock assembly moves the permanent magnet towards the magnetic switch when the lock assembly is moved into the locked state.

8. An apparatus according to claim 7, wherein the permanent magnet is mounted in a magnet housing configured for attachment to a rotating component of the lock assembly, wherein the magnet housing and the magnet rotate with the rotating component of the lock assembly.

9. An apparatus according to claim 1, wherein the panel position sensor is attached to the controller body and operably connected to the controller through the controller body.

10. An apparatus according to claim 9, wherein the panel position sensor comprises a magnetic switch.

11. An apparatus according to claim 10, wherein the apparatus further comprises a plunger assembly separate and discrete from the monitor housing, wherein the plunger assembly is configured for insertion into a bore located in the frame member of the fenestration unit panel proximate the monitor housing, wherein the plunger assembly comprises:
   a plunger mounted for movement along a plunger axis within a plunger housing;
   a permanent magnet attached to the plunger such that the permanent magnet moves along the plunger axis with the plunger; and
   a biasing element located in the plunger housing, the biasing element exerting a biasing force moving the plunger to a first position in which the plunger extends out of the plunger housing, wherein the plunger is configured to move into a second position in the plunger housing along the plunger axis when the plunger is acted on by a force acting on the plunger against the biasing force;
   and wherein the permanent magnet activates the magnetic switch when the plunger is in the second position but does not activate the magnetic switch when the plunger is in the first position.

12. An apparatus according to claim 1, wherein the apparatus further comprises a transmitter located on the controller body and operably connected to the controller, wherein providing an indication of the status of one or both of the lock signal and the panel position signal comprises actuating the transmitter to transmit one or more control signals, wherein the one or more control signals are indicative of the status of one or both of the lock signal and the panel position signal.

13. A method of installing a fenestration unit monitoring apparatus on an existing fenestration unit having a lock assembly mounted on a frame member of a fenestration unit panel, the method comprising:
   attaching a monitor housing to the frame member of the fenestration unit panel, wherein the monitor housing comprises a controller located on a controller body within the monitor housing and a panel position sensor located in the monitor housing and operably connected to the controller, the panel position sensor configured to detect a selected position of the fenestration unit panel and provide a signal to the controller indicative of the selected position of the fenestration unit panel;
   positioning a lock status sensor underneath a base of the lock assembly mounted on the frame member of the fenestration unit panel, a lock status sensor located outside of the monitor housing and operably connected to the controller through one or more conductors, wherein the one or more conductors extend from the controller body to the lock status sensor along a tether, wherein the tether is rotatably attached to the controller body, and wherein attaching the monitor housing to the frame member comprises rotating the tether between a first position and a second position in a plane defined by a base of the monitor housing, and wherein the lock status sensor is configured to detect a status of a lock assembly on the fenestration unit panel;

wherein the controller:
receives a lock signal from the lock status sensor when the lock assembly is in a locked state;
receives a panel position signal from the panel position sensor when the panel position sensor detects that the fenestration unit panel is in the selected position; and
provides an indication of a status of one or both of the lock signal and the panel position signal.

14. A method according to claim 13, wherein the tether comprises a sheet-form substrate, wherein the one or more conductors are located on or in the substrate.

15. A method according to claim 13, wherein the lock status sensor comprises a proximity sensor, and wherein the lock status sensor detects the presence of a lock component of the lock assembly when the lock assembly is in the locked state.

16. A method according to claim 13, wherein the lock status sensor comprises a magnetic switch mounted on the tether and a permanent magnet, wherein positioning the lock status sensor comprises attaching the permanent magnet to the lock assembly, wherein the lock assembly moves the permanent magnet towards the magnetic switch when the lock assembly is moved into the locked state.

17. A method according to claim 13, wherein the panel position sensor is attached to the controller body and operably connected to the controller through the controller body.

18. A method according to claim 13, wherein the fenestration unit monitoring apparatus further comprises a transmitter located on the controller body and operably connected to the controller, wherein providing an indication of the status of one or both of the lock signal and the panel position signal comprises actuating the transmitter to transmit one or more control signals, wherein the one or more control signals are indicative of the status of one or both of the lock signal and the panel position signal.

19. A fenestration unit monitoring apparatus configured for retrofitting an existing fenestration unit having a lock assembly mounted on a frame member of a fenestration unit panel, the fenestration unit monitoring apparatus comprising:
a monitor housing configured for mounting on a surface of the frame member of the fenestration unit panel;
a controller located on a controller body within the monitor housing;
a panel position sensor located in the monitor housing and operably connected to the controller, the panel position sensor configured to detect a selected position of the fenestration unit panel and provide a signal to the controller indicative of the selected position of the fenestration unit panel;
a lock status sensor located on a tether, wherein the lock status sensor is located outside of the monitor housing and operably connected to the controller through one or more conductors, wherein the one or more conductors extend from the controller body to the lock status sensor along the tether, wherein the lock status sensor is configured to detect a status of a lock assembly on the fenestration unit panel, the lock status sensor comprising a magnetic switch mounted on the tether and a permanent magnet configured for attachment to the lock assembly on the fenestration unit panel, wherein the lock assembly moves the permanent magnet towards the magnetic switch when the lock assembly is moved into the locked state;

wherein the controller is configured to:
receive a lock signal from the lock status sensor when the lock assembly is in a locked state;
receive a panel position signal from the panel position sensor when the panel position sensor detects that the fenestration unit panel is in the selected position; and
provide an indication of a status of one or both of the lock signal and the panel position signal.

20. An apparatus according to claim 19, wherein the tether is rotatably attached to the controller body such that the tether is configured to rotate between a first position and a second position in a plane defined by a base of the monitor housing.

21. An apparatus according to claim 19, wherein tether comprises a standoff located between the monitor housing and the lock status sensor, wherein the tether is thicker in the area occupied by the standoff than in the areas not occupied by the standoff and wherein the one or more conductors do not extend through the area occupied by the standoff.

22. An apparatus according to claim 19, wherein the permanent magnet is mounted in a magnet housing configured for attachment to a rotating component of the lock assembly, wherein the magnet housing and the magnet rotate with the rotating component of the lock assembly.

23. An apparatus according to claim 19, wherein the panel position sensor is attached to the controller body and operably connected to the controller through the controller body.

24. A fenestration unit monitoring apparatus configured for retrofitting an existing fenestration unit having a lock assembly mounted on a frame member of a fenestration unit panel, the fenestration unit monitoring apparatus comprising:
a monitor housing configured for mounting on a surface of the frame member of the fenestration unit panel;
a controller located on a controller body within the monitor housing;
a panel position sensor located in the monitor housing and operably connected to the controller, the panel position sensor configured to detect a selected position of the fenestration unit panel and provide a signal to the controller indicative of the selected position of the fenestration unit panel, wherein the panel position sensor comprises a magnetic switch, and wherein the panel position sensor is attached to the controller body and operably connected to the controller through the controller body;
a lock status sensor located on a tether, wherein the lock status sensor is located outside of the monitor housing and operably connected to the controller through one or more conductors, wherein the one or more conductors extend from the controller body to the lock status sensor along the tether, and wherein the lock status sensor is configured to detect a status of a lock assembly on the fenestration unit panel;
a plunger assembly separate and discrete from the monitor housing, wherein the plunger assembly is configured for insertion into a bore located in the frame member of the fenestration unit panel proximate the monitor housing, wherein the plunger assembly comprises:

a plunger mounted for movement along a plunger axis within a plunger housing;

a permanent magnet attached to the plunger such that the permanent magnet moves along the plunger axis with the plunger; and a biasing element located in the plunger housing, the biasing element exerting a biasing force moving the plunger to a first position in which the plunger extends out of the plunger housing, wherein the plunger is configured to move into a second position in the plunger housing along the plunger axis when the plunger is acted on by a force acting on the plunger against the biasing force;

and wherein the permanent magnet activates the magnetic switch when the plunger is in the second position but does not activate the magnetic switch when the plunger is in the first position;

wherein the controller is configured to:

receive a lock signal from the lock status sensor when the lock assembly is in a locked state;

receive a panel position signal from the panel position sensor when the panel position sensor detects that the fenestration unit panel is in the selected position; and provide an indication of a status of one or both of the lock signal and the panel position signal.

25. An apparatus according to claim 24, wherein the tether is rotatably attached to the controller body such that the tether is configured to rotate between a first position and a second position in a plane defined by a base of the monitor housing.

26. An apparatus according to claim 24, wherein tether comprises a standoff located between the monitor housing and the lock status sensor, wherein the tether is thicker in the area occupied by the standoff than in the areas not occupied by the standoff and wherein the one or more conductors do not extend through the area occupied by the standoff.

27. An apparatus according to claim 24, wherein the lock status sensor comprises a proximity sensor configured to detect presence of a lock component of the lock assembly when the lock assembly is in the locked state.

* * * * *